March 19, 1929.   B. P. HOFFMAN   1,705,566
PACKING FOR OIL WELL STUFFING BOXES
Filed Dec. 20, 1926
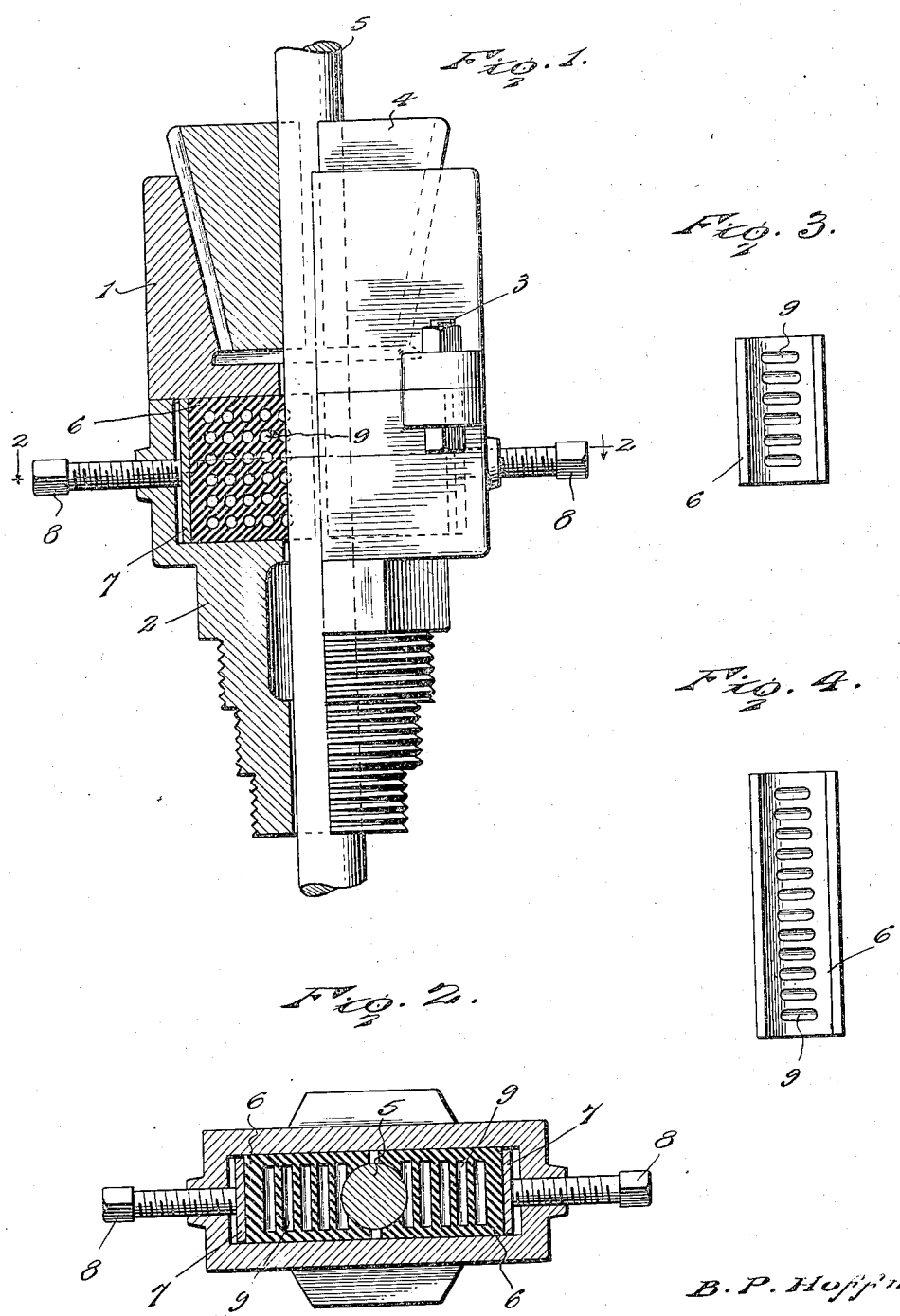

Patented Mar. 19, 1929.

1,705,566

UNITED STATES PATENT OFFICE.

BENJAMIN P. HOFFMAN, OF TULSA, OKLAHOMA, ASSIGNOR TO THE PIERCE DEVELOPMENT COMPANY, OF TULSA, OKLAHOMA, A CORPORATION OF OKLAHOMA.

PACKING FOR OIL-WELL STUFFING BOXES.

Application filed December 20, 1926. Serial No. 156,011.

In the oil fields loss of production is effected by stuffing boxes and cooperating packing. This packing is usually of soft rubber in which are formed grooves or openings of a depth to catch and hold oil, thereby causing the packing to deteriorate and necessitating frequent replacement and a shutting down of the well and a consequent loss during the period of idleness.

The present invention provides a packing specially adapted to oil well apparatus which is effective, durable and lasting and which does not require frequent replacement and obviates the loss incident thereto.

The invention consists of a packing preferably of soft rubber provided with transversely disposed openings or tubular recesses closed at their ends and arranged to be brought successively into operative position as the packing wears. Thus that part of the packing remote from the wearing surface is preserved and not susceptible to deterioration as would be the case if oil were permitted to remain in contact therewith for any very great length of time.

While the drawings illustrate a preferred embodiment of the invention, it is to be understood that in adapting the means to meet specific needs and requirements, the design may be varied and such other changes in the minor details of construction may be resorted to within the scope of the invention as claimed without departing from the spirit thereof.

For a full understanding of the invention and the merits thereof, reference is to be had to the following description and the drawings hereto attached, in which, —

Figure 1 is an elevational view of an oil well stuffing box provided with packing embodying the invention, one-half of the box being in section.

Figure 2 is a horizontal sectional view on the line 2—2 of Figure 1.

Figure 3 is a front view of a stuffing box packing.

Figure 4 is a view similar to Figure 3 of a packing designed for an oil saver.

Corresponding and like parts are referred to in the following description and designated in the several views of the drawings by like reference characters.

The stuffing box illustrated comprises an upper section 1, and a lower section 2, the latter being stepped and comprising portions adapted to fit different sized tubing, and in consequence, the stuffing box is adapted for use in connection with tubing of different sizes or diameters. The sections 1 and 2, when assembled, are connected by bolts 3 passing through outer flanges or ears. The upper section 1 is recessed to receive clamps 4 which are reversible to grip a rod 5 or like part when its diameter changes by stretching. The lower section 2 of the stuffing box is recessed to receive the packing 6 and a follower 7 which is fed forwardly as the packing wears by means of an adjusting screw 8 threaded into a side of the box.

The packing 6 is preferably of soft rubber and in accordance with the invention it is formed with a plurality of openings or tubular recesses 9 which have a transverse arrangement and terminate within the sides of the packing to prevent entrance of oil therein while at the same time rendering the packing yieldable and flexible. The openings or recesses 9 are molded within the body of the packing and are closed at their ends. The element 5 may be the usual polish rod or operating line and the packing is disposed upon opposite sides thereof, as indicated most clearly in Figure 2. The openings 9 are relatively small and are disposed perpendicular to the sides of the packing and at regular intervals throughout the extent of the body, so that as the packing wears, the openings successively advance and come into operative position. As a result of this construction, the active face of the packing in contact with the operating element 5 is provided with a plurality of shallow pockets and edges which catch the oil and prevent its escape and waste. The transverse openings 9 are closely related and are separated by a small portion of the packing and in consequence, the openings are successively brought into operative position, and those remote from the active face of the packing do not receive any of the oil, thereby preventing rapid deterioration of the packing as would be the case if the openings were of a depth to provide pockets for holding the oil for any very great length of time.

In the preferable arrangement the openings 9 are disposed in parallel rows and are molded wholly within the body of the packing. The active face of the packing exposes the openings of the first row, thereby providing a plurality of shallow pockets and scraping edges to remove the surplus oil from the operating element 5 and prevent waste. As the packing wears the relatively thin septum between the openings of the first and second rows is cut through, thereby bringing the openings of the second row in active position, and so on throughout the extent of the packing, the several rows of openings being successively brought into operative position as the packing wears.

It should be remembered that the packing being formed of rubber is compressible and mobile, hence the portions adjacent to and in contact with the operating member 5 conform thereto and equalize the wear and pressure, thereby admitting of the rows of openings successively coming into active position. It is observed moreover, that in practice the packing is formed of two similar longitudinal sections which are placed together, with the openings registering, and then vulcanized.

Having thus described the invention, I claim:

A packing for oil well apparatus consisting of soft rubber provided throughout its extent with a plurality of tubular recesses closed at their ends and which are successively brought into operative position as the packing wears to provide a plurality of shallow pockets and edges at the active or wearing surface of the packing.

In testimony whereof I affix my signature.

BENJAMIN P. HOFFMAN. [L. S.]